US007009600B2

(12) United States Patent
Jones et al.

(10) Patent No.: US 7,009,600 B2
(45) Date of Patent: Mar. 7, 2006

(54) DATA PROCESSING SYSTEM DISPLAY SCREEN INCLUDING AN IMAGE ALTERATION AREA

(75) Inventors: Jeffrey Allen Jones, Round Rock, TX (US); Alvaro Sanchez-Cifuentes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 10/246,948

(22) Filed: Sep. 19, 2002

(65) Prior Publication Data

US 2004/0119699 A1    Jun. 24, 2004

(51) Int. Cl.
 *G09G 5/00* (2006.01)
(52) U.S. Cl. ..................... 345/173; 345/660
(58) Field of Classification Search ............... 345/173, 345/660, 661, 663, 666, 667, 671
See application file for complete search history.

(56) References Cited

U.S. PATENT DOCUMENTS

| 4,532,605 | A | * | 7/1985 | Waller ..................... 345/661 |
| 4,546,349 | A | * | 10/1985 | Prohofsky et al. .......... 345/667 |
| 4,790,028 | A | * | 12/1988 | Ramage ..................... 382/298 |
| 5,038,138 | A | * | 8/1991 | Akiyama et al. ........... 345/684 |
| 5,165,384 | A | | 11/1992 | Knutson .................. 126/25 C |
| 5,187,776 | A | * | 2/1993 | Yanker ..................... 715/800 |
| 5,325,278 | A | | 6/1994 | Tortola et al. ............. 362/109 |
| 5,615,384 | A | * | 3/1997 | Allard et al. .............. 345/800 |
| 6,067,459 | A | | 5/2000 | Lincoln et al. ............. 455/566 |
| 6,073,036 | A | | 6/2000 | Heikkinen et al. .......... 455/575 |
| 6,184,859 | B1 | * | 2/2001 | Kojima ..................... 345/629 |
| 6,211,856 | B1 | * | 4/2001 | Choi et al. ................. 345/666 |
| 6,268,854 | B1 | * | 7/2001 | Borden et al. ............. 715/786 |
| 6,275,333 | B1 | | 8/2001 | Shaffer ..................... 359/440 |
| 6,466,203 | B1 | * | 10/2002 | Van Ee ..................... 345/173 |
| 6,515,678 | B1 | * | 2/2003 | Boger ....................... 345/660 |
| 6,590,583 | B1 | * | 7/2003 | Soohoo ..................... 345/660 |
| 6,621,486 | B1 | * | 9/2003 | Park et al. ................. 345/173 |
| 6,700,589 | B1 | * | 3/2004 | Canelones et al. ......... 345/660 |
| 2002/0105531 | A1 | * | 8/2002 | Niemi ....................... 345/660 |
| 2003/0117419 | A1 | * | 6/2003 | Hermanson ................ 345/660 |
| 2003/0214519 | A1 | * | 11/2003 | Smith et al. ............... 345/660 |

FOREIGN PATENT DOCUMENTS

| JP | 05046315 A | * | 2/1993 |
| JP | 2002132445 A | * | 5/2002 |

* cited by examiner

*Primary Examiner*—Amr A. Awad
*Assistant Examiner*—Tom Sheng
(74) *Attorney, Agent, or Firm*—Duke W. Yee; Marilyn Smith Dawkins; Lisa L. B. Yociss (57) ABSTRACT

A data processing system, method, and computer program product are disclosed which include a display screen within a housing. The housing includes a horizontal mechanism parallel to a horizontal side of the display screen and a vertical mechanism parallel to a vertical side of the display screen. The display screen includes a display area and an image alteration area. The image alteration area may be accessed through the vertical and horizontal mechanisms. An input may be received at a discrete point along one of the mechanisms. In response to a receipt of an input, an image displayed within the display area is magnified.

3 Claims, 5 Drawing Sheets

DATA PROCESSING SYSTEM DISPLAY SCREEN INCLUDING AN IMAGE ALTERATION AREA

BACKGROUND OF THE INVENTION

1. Technical Field

The present invention relates generally to the field of data processing systems and, more specifically to a data processing system, method, and computer program product including a display screen having an image alteration area for indicating magnification.

2. Description of Related Art

Several different techniques are known in the art for magnifying images displayed on a display screen. Many of these systems are used to magnify the display screen of a cellular telephone.

U.S. Pat. No. 6,275,333B1, issued to Shaffer, describes a magnification device that includes multiple different lenses that may be used to magnify a cellular telephone display. A lens that provides a predetermined degree of magnification is selected and coupled to the display such that the lens is located over and magnifies the display. This lens also provides a predetermined degree of magnification that can not be altered.

U.S. Pat. No. 6,067,459, issued to Lincoln, describes a lens that can be mounted on a cellular telephone display that will magnify the display. This lens provides a predetermined degree of magnification that can not be altered.

U.S. Pat. No. 5,325,278, issued to Tortola, describes a magnifier apparatus that includes a magnifier portion that comprises a frame and a magnifying lens secured within the frame. The lens is adapted to conform with the computer video screen.

All of these approaches involve the use of lenses that are applied over the display to magnify an image. Although the lens described by these systems may be practical for very small screens such as those used in cellular telephones, these lens are not practical for large displays such as the kind used for desktop, personal, or other large computer systems. As a result, other techniques for panning and zooming are used in larger displays.

For computer systems including desktop computer systems, personal computers, network computers, personal digital assistants, and other types of computing devices, panning and zooming have been available to a user through the use of particular keystrokes or task bar selections. All of these approaches, however, require a user to select image alteration functions, such as panning or zooming, through the display area itself. For example, a particular zoom icon may be selected using a mouse. This icon, though, is displayed to a user within the display area.

A computer display screen includes a display area. This area is used to display images, text, and information to a user. The display area is the only area on a computer display screen that is used to display these images, text, and information. When a window is maximized, for example, it will occupy the entire display area of the display screen.

The approaches described above for panning and zooming within a computer system are executed within the computer system by a software application or driver. Executing these software applications or drivers can reduce the efficiency of the computer systems.

A "personal digital assistant" (hereinafter "PDA") is defined as a hand held microcomputer designed for individual use and includes at least a local central processing unit (CPU), a touch screen (or other equivalent user interface such as a keypad, a screen with mouse, voice recognition system, or pen-based input, etc.), memory for storing information, and input/output capability for reading and writing information. A PDA typically includes a small display screen that may be difficult to see. Although the panning and zooming techniques that have been used in desktop computer systems could be used in smaller systems, such as PDAs, these techniques require processor time and resources because they are implemented in software that must be executed by the smaller system. Previous techniques also consume valuable screen real estate.

Therefore, a need exists for a method, system, and computer program product that (i) includes an image alteration area that is separate from a display area of a display screen, (ii) does not consume a large amount of screen real estate, (iii) is easy to use, and (iv) is capable of being implemented in hardware within the system.

SUMMARY OF THE INVENTION

A data processing system, method, and computer program product are disclosed which include a display screen within a housing. The housing includes a horizontal mechanism parallel to a horizontal side of the display screen and a vertical mechanism parallel to a vertical side of the display screen. The display screen includes a display area and an image alteration area. The image alteration area may be accessed through the vertical and horizontal mechanisms. An input may be received at a discrete point along one of the mechanisms. In response to a receipt of an input, an image displayed within the display area is magnified.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a data processing system, method, and computer program product that includes a display screen within a housing. The housing includes a horizontal mechanism parallel to a horizontal side of the display screen and a vertical mechanism parallel to a vertical side of the display screen. The display screen includes a display area and an image alteration area. The image alteration area may be accessed through the vertical and horizontal mechanisms. An image displayed in the display area is altered, such as by magnifying or panning, in response to a receipt of an input within the image alteration area. The image alteration area may include a first area and a second area where the first area is a vertical area bordering a first side of the display area and the second area is a horizontal area bordering a second side of the display area.

The display screen may include a touch sensitive surface. In one embodiment, the image alteration area may be accessed through one or more open guides in a housing that holds the display screen. In this embodiment, a portion of the touch sensitive display screen extends underneath the housing. The display screen is capable of receiving touch inputs in the portion of the display screen that extends underneath the housing. Thus, the image alteration areas are located underneath and accessed through the guides. In another embodiment, the image alteration area is separate from but borders the display area.

The present invention also includes a hardware translator device. The hardware translator maintains a mapping of the coordinates of a displayed image to the coordinates of the full screen image. The translator maps the coordinates of a particular location selected within an altered image to the coordinates of the same location within the full screen image.

When a first input is received within an image alteration area, the full screen image is magnified so that only a portion is displayed using the entire display area. A predetermined magnification level is used when this first input is received. Subsequent inputs received within the image alteration area prior to a receipt of a restore input will cause panning through the displayed image. When a restore input is received, the full screen image is restored so that it is again displayed using the entire display area. The first input that is received after the receipt of a restore input will cause the full screen image to be magnified at a predetermined point in conjunction with the location of the first input. Subsequent inputs will cause panning.

A predetermined magnification level is used when the first input is received to display a first portion of the full screen image. If a user wishes to magnify the displayed first portion further the user may double-click on the image alteration area. As described above, a portion of the displayed first portion that is associated with the selected location of the image alteration area will be further magnified so that a second portion of the full screen image is displayed. A larger magnification level is used in order to display the second portion. Additional double-click inputs will cause further zooming until a maximum magnification level is reached. The user may return to the full screen image by selecting a restore input.

Figure 1:
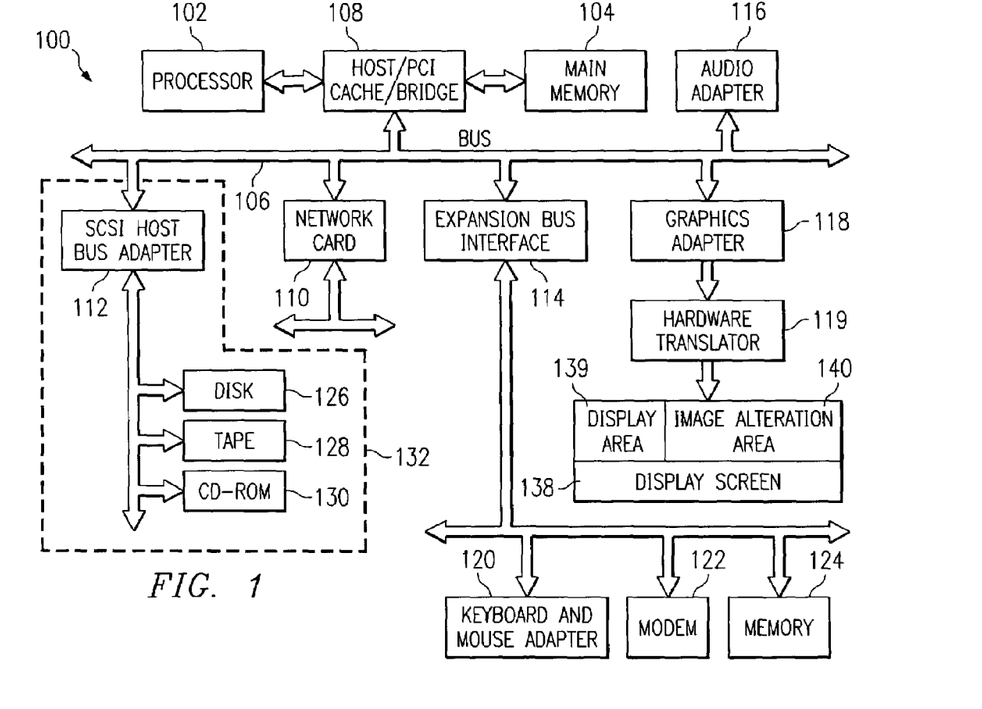
FIG. 1 is a block diagram of a data processing system which may be used to implement the present invention.

FIG. 1 depicts a block diagram illustrating a data processing system in which the present invention may be implemented. Data processing system 100 may be utilized to implement a personal digital assistant, a cellular telephone, a desktop or laptop computer system, or any other type of computer system that includes the present invention. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. Network card 110, audio adapter 116, and graphics adapter 118 are coupled to bus 106.

A display screen 138 is included that may be a touch-screen display or non-touchscreen display. Display screen 138 may be incorporated into a personal digital assistant as its display, or may be the stand-alone display for a desktop or larger computer system.

Display screen 138 includes a display area 139 and an image alteration area 140. Display screen 138 is coupled to graphics adapter 118 through hardware translator 119. Hardware translator 119 is used to translate coordinates from an altered image to the full screen image so that the remaining components of data processing system 100 can process data as if the full screen image is being displayed.

Image alteration area 140 may receive any type of input such as optical or mechanical inputs. For example, a mechanical slider may be used to indicate a particular physical position within image alteration area 140, and thus, image alteration area 140 would receive mechanical inputs.

Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as Windows 2000, which is available from Microsoft Corporation. An object oriented programming system such as Java may run in conjunction with the operating system and provide calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device, which is configured with ROM and/or flash ROM in order to provide non-volatile memory for storing operating system files and/or user-generated data.

The depicted example in FIG. 1 and above-described examples are not meant to imply architectural limitations. For example, data processing system 100 also may be a notebook computer or hand held computer in addition to taking the form of a PDA. Data processing system 100 also may be a kiosk or a Web appliance.

Figure 2:
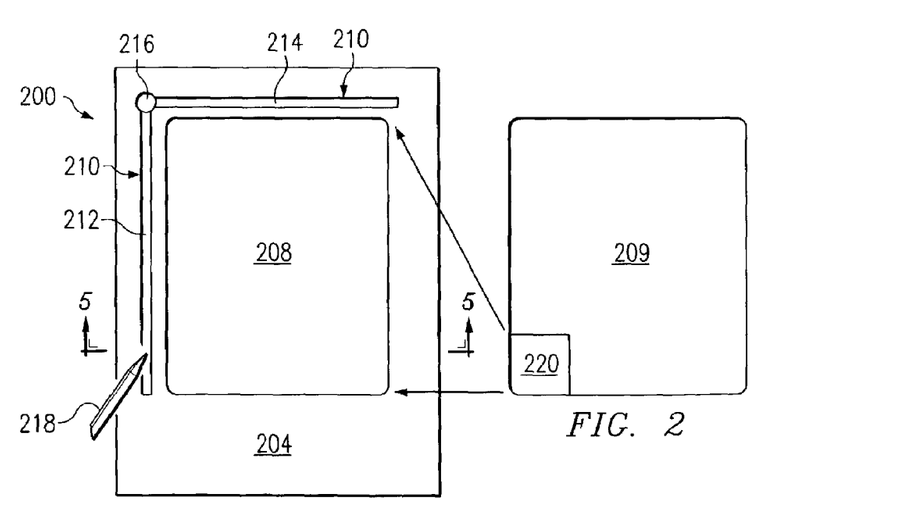
FIG. 2 is a pictorial representation of a data processing system including a display screen having an open guide through which an image alteration area may be accessed to magnify a first section of a full screen image in accordance with the present invention.

FIG. 2 is a pictorial representation of a data processing system including a display screen having an open guide through which an image alteration area may be accessed to magnify a first section of a full screen image in accordance with the present invention.

Figure 5:
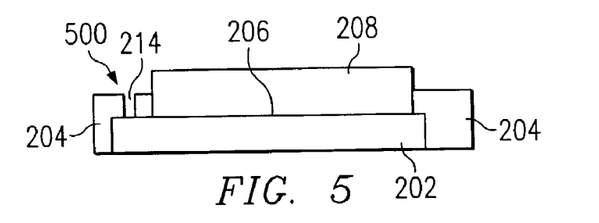
FIG. 5 is a side view of the data processing system taken along line 5—5 shown in FIG. 2 depicting an open guide through a housing of the data processing system in accordance with the present invention.
Figure 6:
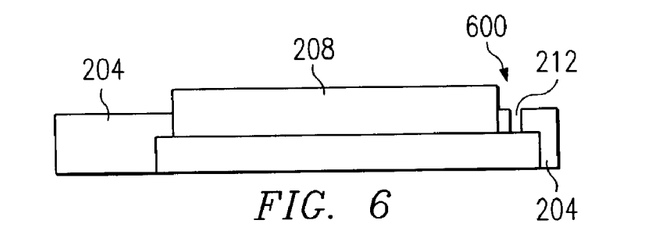
FIG. 6 is a side view of the data processing system taken along line 6—6 shown in FIG. 3 depicting an open guide through a housing of the data processing system in accordance with the present invention.

Data processing system 200 includes a display screen 202 preferably having a touch sensitive surface 206 that is held in a housing 204 (see FIGS. 5 and 6). Display screen 202 includes a display area 208 and an image alteration area 210.

Image alteration area 210 may include a first image alteration area 212 and a second image alteration area 214. First image alteration area 212 is vertical and parallels a side of display area 208. Second image alteration area 214 is horizontal and parallels a second side of display area 208. For example, second image alteration area 214 parallels a top of display area 208. Either alteration area 212 or 214 may be used to either zoom or pan within a displayed image.

A restore button 216 is included and may be used to restore an image such that the full screen image is displayed using the entire display area 208. Restore button 216 may be located at an intersection of first image alteration area 212 and second image alteration area 214.

A pointing device 218, such as a stylus or a user's finger, may be used to touch surface 206 of display screen 202 (see FIG. 5). When pointing device 218 is used to touch a location within an image alteration area, the image displayed in display area 208 is magnified.

Although coordinate translation may be executed in software, a preferred embodiment of the present invention includes a hardware translator for translating coordinates. Hardware translator 119 is included in system 200 which receives inputs to image alteration area 210. Hardware translator 119 maintains a mapping of the coordinates of a displayed image to the coordinates of the full screen image.

The components of data processing system 200, except for hardware translator 119, will process data as if a full screen image is being displayed. Hardware translator 119 is responsible for maintaining a mapping of the coordinates of an altered image to the coordinates of the full screen image. For example, if the display area is currently displaying only a lower left hand portion of the full screen image and a user accesses a particular location of the altered image, the coordinate of the accessed location of the altered image must be mapped to the coordinate of the same location within the full screen image. All components of data processing system 200, except hardware translator 119, will process the coordinate of the location of the full screen image.

When an input is received within image alteration area 210 and the full image has not already been magnified, a portion of the full screen image associated with the location of the received input will be magnified. For example, as depicted by FIG. 2, if an input is received at a location toward the bottom of area 212, the portion 220 located in the lower left corner of the full screen image 209 will be magnified such that portion 220 is displayed using entire display area 208. Thus, a magnified image 220 is displayed in display area 208.

The magnification default depicted by FIG. 2 is the lower left corner of the full screen image associated with the location toward the bottom of area 212 if no previous input is received along input area 214. Other magnification defaults could be specified by a user such that another area of the full screen image is predetermined to be associated with the location toward the bottom of area 212. For example, a lower right corner of the full screen image could be associated with the location toward the bottom of area 212 such that the lower right corner is magnified using the entire display area when an input within the location toward the bottom of area 212 is received.

Further, in the depicted example, other panning defaults could be specified by a user. For example, a user could specify that panning be performed diagonally through the full screen image. As such, as the input changes from the lower portion of input area 212 to the upper portion of input area 212, the area displayed moves from the bottom right to the upper left. In the embodiment illustrated herein, however, the panning defaults to maintaining a constant position with respect to the other axis, if no further input is received on that other axis.

The size of region 220 is a predefined default size. Any predefined size could be used, taking into account the display area size and the amount of the desired magnification.

Figure 3:
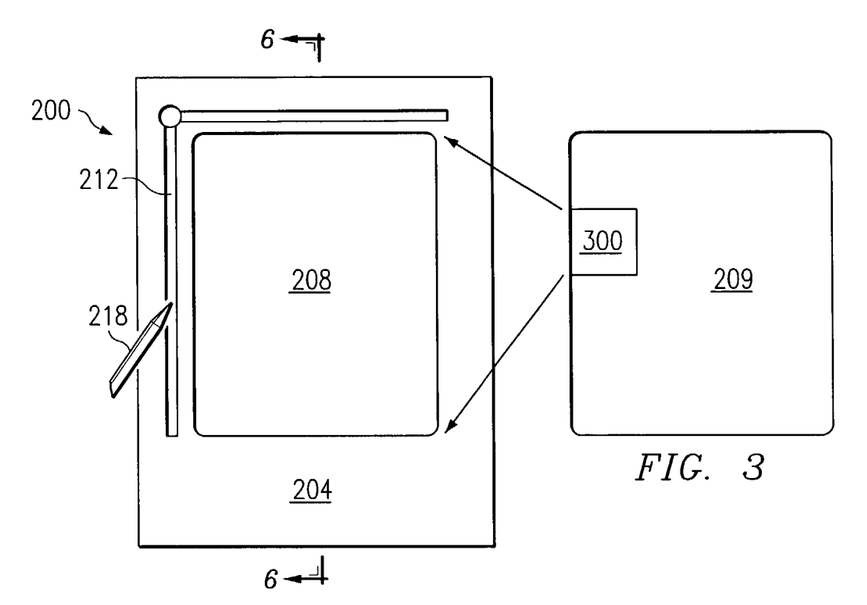
FIG. 3 is a pictorial representation of a data processing system including a display screen having an open guide through which an image alteration area may be accessed to pan to a second section of a full screen image in accordance with the present invention.

FIG. 3 is a pictorial representation of a data processing system including a display screen having an open guide through which an image alteration area may be accessed to pan to a second section of a full screen image in accordance with the present invention.

If an input has already been received within image alteration area 210 such that a magnified image is displayed, when another input is received, that input will indicate a portion within image 209 to which to pan. For example, if altered image 220 (see FIG. 2) is displayed using entire display area 208 and an input is received in the middle of image alteration area 212, the full image 209 will be panned in order to display altered image 300 using the entire display area 208.

Figure 4:
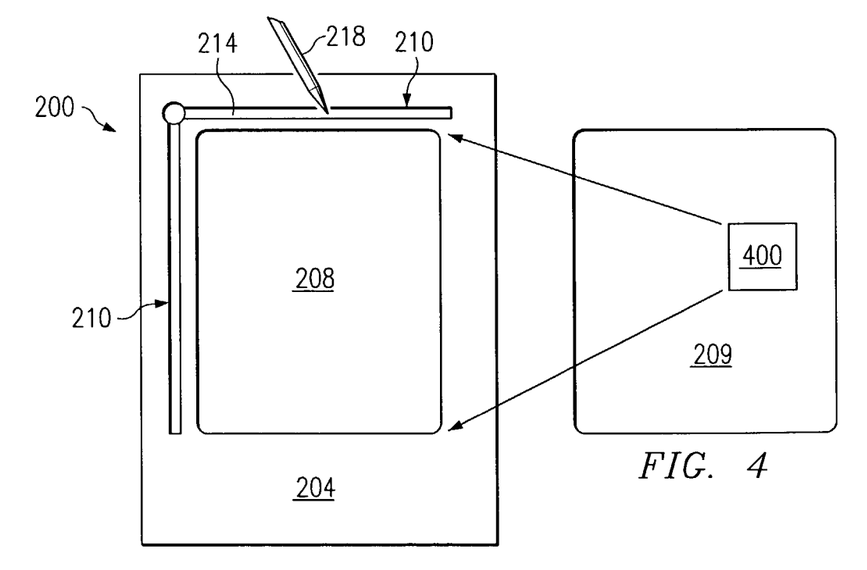
FIG. 4 is a pictorial representation of a data processing system including a display screen having an open guide through which an image alteration area may be accessed to pan to a third section of a full screen image in accordance with the present invention.

FIG. 4 is a pictorial representation of a data processing system including a display screen having an open guide through which an image alteration area may be accessed to pan to a third section of a full screen image in accordance with the present invention.

If an input has already been received within image alteration area 210 such that a magnified image is displayed, when another input is received, that input will indicate a portion within image 209 to which to pan. For example, if altered image 300 (see FIG. 3) is displayed using entire display area 208 and an input is received toward the right of the middle of image alteration area 214, the full image 209 will be panned from the location of image 300 in order to display altered image 400 using the entire display area 208.

FIG. 5 is a side view of the data processing system taken along line 5—5 shown in FIG. 2 depicting an open guide through a housing of the data processing system in accordance with the present invention.

Housing 204 includes an open guide 500 through which image alteration area 214 may be accessed. Guide 500 is open through housing 204 to expose a portion of display screen 202. The portion of the display screen 202 that is exposed is that portion which includes image alteration area 214. Thus, image alteration area 214 is located underneath guide 500. Guide 500 permits a pointing device 218 to touch a portion of image alteration area 214.

FIG. 6 is a side view of the data processing system taken along line 6—6 shown in FIG. 3 depicting an open guide through a housing of the data processing system in accordance with the present invention.

Housing 204 includes an open guide 600 through which image alteration area 212 may be accessed. Guide 600 is open through housing 204 to expose a portion of display screen 202. The portion of the display screen 202 that is exposed is that portion which includes image alteration area 212. Thus, image alteration area 212 is located underneath guide 600. Guide 600 permits a pointing device 218 to touch a portion of image alteration area 212.

Figure 7:
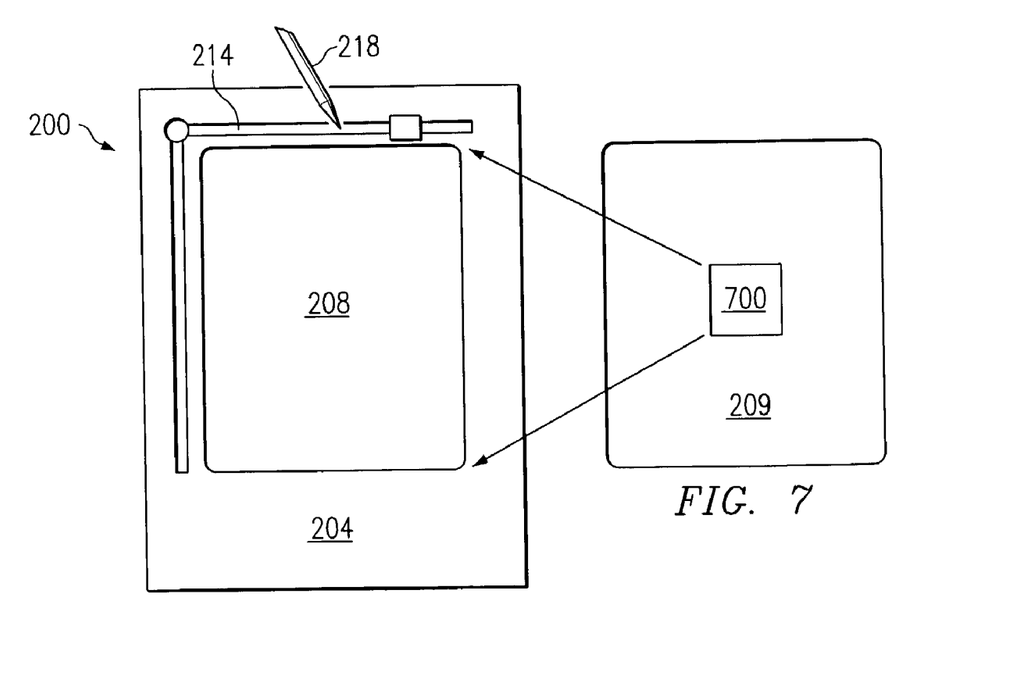
FIG. 7 is a pictorial representation of a data processing system including a display screen having an open guide through which an image alteration area may be accessed to pan to a fourth section of a full screen image in accordance with the present invention.

FIG. 7 is a pictorial representation of a data processing system including a display screen having an open guide through which an image alteration area may be accessed to pan to a fourth section of a full screen image in accordance with the present invention.

When an input is received within image alteration area 214 and the full image has not already been magnified, a portion of the full image that is associated with the location of the received input will be magnified. For example, as depicted by FIG. 7, if an input is received in the middle of area 214, the portion 700 located in the middle of the full screen image 209 will be magnified such that portion 700 is displayed using entire display area 208. Thus, a magnified image 700 is displayed in display area 208.

Figure 8:
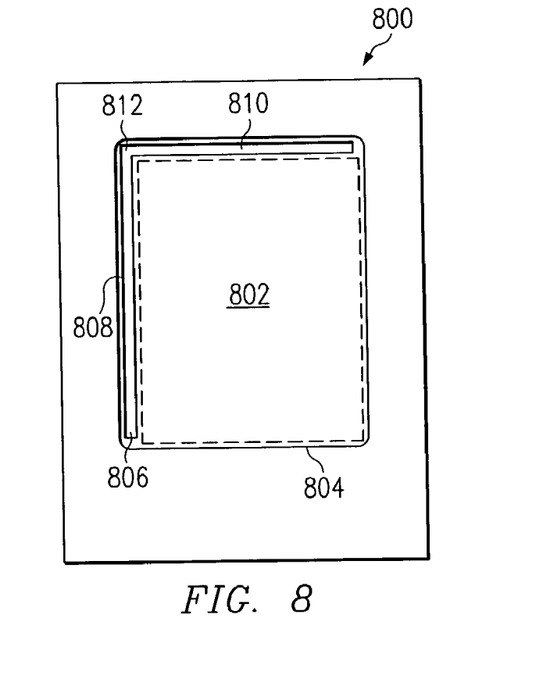
FIG. 8 is a data processing system including a display screen having a display area and an image alteration area that is separate from but borders the display area in accordance with the present invention.

FIG. 8 is a data processing system including a display screen having a display area and an image alteration area that is separate from but borders the display area in accordance with the present invention.

Data processing system 800 includes a display screen 802. Display screen 802 preferably has a touch sensitive surface. Display screen 802 includes a display area 804 and an image alteration area 806.

Image alteration area 806 may include a first image alteration area 808 and a second image alteration area 810. First image alteration area 808 is vertical and borders a side of display area 804. Second image alteration area 810 is horizontal and borders a second side of display area 804.

A restore button 812 is included and may be used to restore an image such that the full screen image is displayed in display area 804.

A pointing device, such as a stylus or a user's finger, may be used to touch the surface of display screen 804. When a pointing device is used to touch image alteration area 806, the image displayed in display area 804 is altered.

Figure 9:
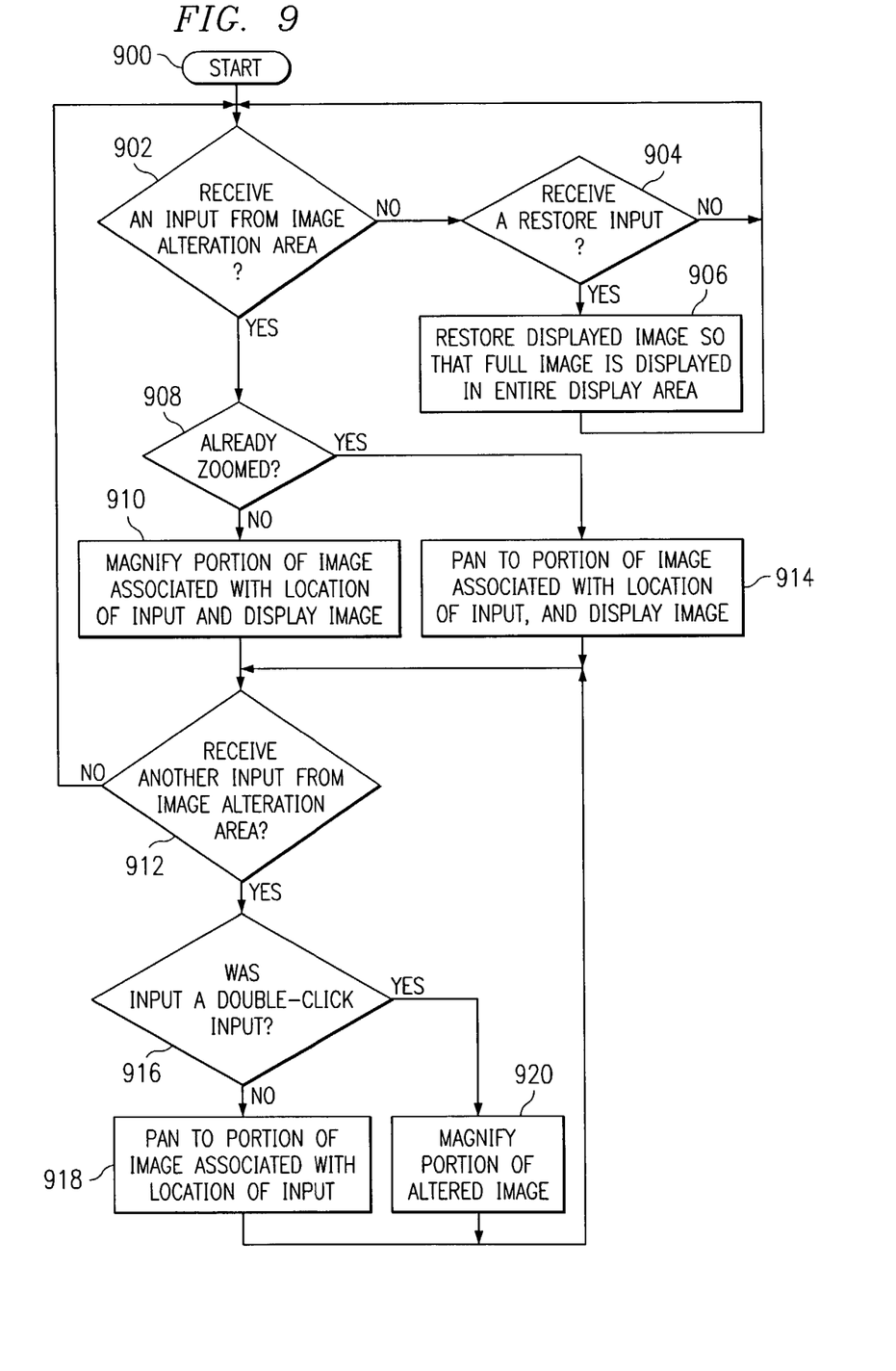
FIG. 9 depicts a high level flow chart which illustrates altering an image in response to a receipt of an input in an image alteration area in accordance with the present invention.

FIG. 9 depicts a high level flow chart which illustrates altering an image in response to a receipt of an input in an image alteration area in accordance with the present invention. The process starts as depicted by block 902 and thereafter passes to block 904 which illustrates a determination of whether or not an input has been received within the image alteration area. The image alteration area includes the first area 212 and the second area 214. If a determination is made that no input has been received within either area 212 or 214, the process passes to block 904 which illustrates a determination of whether or not an input has been received by restore button 216. If a determination is made that no input has been received by restore button 216, the process passes back to block 902.

Referring again to block 904, if a determination is made that an input has been received by restore button 904, the process passes to block 906 which depicts restoring a full image such that the full image is displayed in the entire display area 208. The process then passes back to block 902.

Referring again to block 902, if a determination is made that an input has been received in either area 212 or 214, the process passes to block 908 which illustrates a determination of whether or not display area 208 is displaying a magnified image. If display area 208 is not already displaying a magnified image, i.e. it is displaying the full image, the process passes to block 910 which depicts magnifying a predefined portion of the full screen image associated with the location of the received input. The magnified image is then displayed using the entire display area 208. The process then passes to block 912.

Referring again to block 906, if a determination is made that display area 208 is already displaying a magnified image, the process passes to block 914 which illustrates panning to a portion of the image that is associated with the location of the received input. The portion of the image is then displayed using the entire display area 208. The process then passes to block 912.

Block 912 depicts a determination of whether or not another input has been received within either area 212 or 214. If a determination is made that no other input has been received within area 212 or 214, the process passes back to block 902. Referring again to block 912, if a determination is made that another input has been received from either area 212 or 214, the process passes to block 916.

Block 916 depicts a determination of whether or not the received input was a double-click input. If a determination is made that the input was not a double-click, the process passes to block 918 which illustrates panning to a portion of the image that is associated with the location of the received input. The process then passes to block 912.

Referring again to block 916, if a determination is made that the received input was a double-click input, the process passes to block 920 which depicts magnifying a portion of the displayed, altered image that is associated with the location of the received double-click. The process then passes to block 912.

Figure 10:
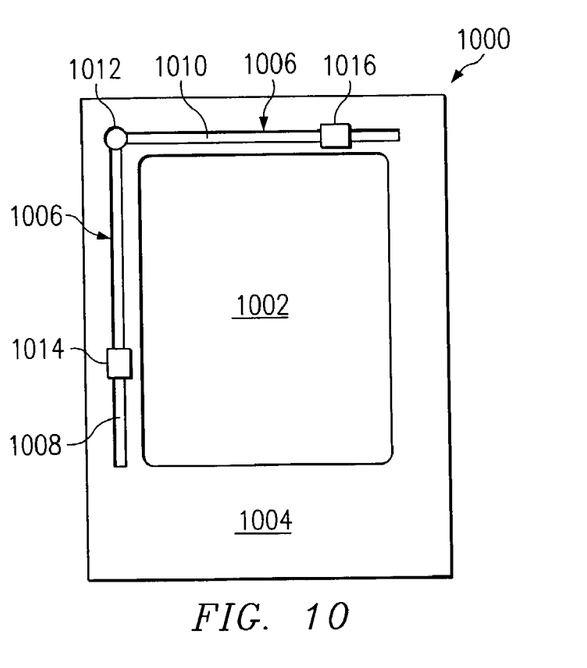
FIG. 10 is a data processing system including a display screen having a display area, an image alteration area, and sliders used for magnifying and panning in accordance with the present invention.

FIG. 10 is a data processing system including a display screen having a display area, an image alteration area, and sliders used for magnifying and panning in accordance with the present invention.

Data processing system 1000 includes a display screen 1002 within a housing 1004. Display screen 1002 may have a touch sensitive surface. Display screen 1002 includes an image alteration area 1006.

Image alteration area 1006 may include a first image alteration area 1008 and a second image alteration area 1010. First image alteration area 1008 is vertical and borders a side of display screen 1002. Second image alteration area 1010 is horizontal and borders a second side of display screen 1002.

A restore button 1012 is included and may be used to restore an image such that the full screen image will be displayed in display screen 1002 after button 1012 is selected.

A first slider 1014 is located within first area 1008, and a second slider 1016 is located within second area 1010. First slider 1014 may be used to select an area within display screen 1002 for magnifying. Second slider 1016 may be used for panning through an image that is displayed within screen 1002. Alternatively, second slider 1016 may be used to select an area within display screen 1002 for magnifying, while first slider 1014 may be used for panning through an image that is displayed within screen 1002.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A display screen within a housing, comprising:
   a horizontal mechanism in the housing parallel to a horizontal side of the display screen;
   a vertical mechanism in the housing parallel to a vertical side of the display screen;
   means for receiving input at at least one discrete point along one of the mechanisms for indicating an area of the display screen to be magnified;
   an open guide through said housing for receiving a pointing device;
   said means for receiving input being an image alteration area;
   said open guide being located over said image alteration area; and
   said pointing device capable of touching said image alteration area when said pointing device is received within said open guide.

2. The system according to claim 1, further comprising: said pointing device being a stylus.

3. The system according to claim 1, further comprising: said pointing device being a user's finger.

* * * * *